United States Patent
Ronström

(10) Patent No.: US 6,216,136 B1
(45) Date of Patent: Apr. 10, 2001

(54) METHOD FOR PERFORMING COMPLICATED SCHEMA CHANGES WITHIN A DATABASE

(75) Inventor: Ulf Mikael Ronström, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/115,905

(22) Filed: Jul. 15, 1998

(30) Foreign Application Priority Data

Jul. 21, 1997 (SE) .................................................. 9702763

(51) Int. Cl.⁷ .................................................. G06F 12/00
(52) U.S. Cl. ........................ 707/203; 707/101; 707/102; 707/204
(58) Field of Search ................... 707/3, 8, 101, 707/103, 100, 203, 204, 102; 395/710

(56) References Cited

U.S. PATENT DOCUMENTS

| | | | |
|---|---|---|---|
| 5,280,612 | * 1/1994 | Lorie et al. ........................ | 707/8 |
| 5,410,703 | 4/1995 | Nilsson et al. .................... | 595/712 |
| 5,442,783 | * 8/1995 | Oswald et al. ..................... | 707/101 |
| 5,717,924 | * 2/1998 | Kawai ................................. | 707/102 |
| 5,734,899 | * 3/1998 | Yoshizawa et al. ............... | 707/203 |
| 5,765,171 | * 6/1998 | Gehani et al. ..................... | 707/203 |
| 5,794,030 | * 8/1998 | Morsi et al. ....................... | 707/203 |
| 5,850,554 | * 12/1998 | Carver ............................... | 395/710 |
| 5,881,378 | * 3/1999 | Hayashi et al. .................... | 707/100 |
| 5,950,210 | * 9/1999 | Nelson ............................... | 707/203 |
| 5,999,947 | * 12/1999 | Zollinger et al. ................... | 707/203 |

OTHER PUBLICATIONS

"Axiomatization of Dynamic Schema Evolution in Object-bases", Randal J. Peters et al., *IEEE*, vol. 95 (1995) pp. 156–163.

"Beyond Schema Evolution to Database Reorganization", Barbara S. Lerner et al., *ECOOP/OOPSLA '90 Proceedings* (Oct. 1990) pp. 67–76.

"Type Evolution Support for Complex Type Changes", Barbara S. Lerner et al., *CMPSCI Technical Report 94–71*, University of Massachusetts, Amherst, Oct. 31, 1994, pp. 1–18.

"Schema Evolution and Integration", Stewart M Clamen, *Distributed and Parallel Databases*, vol. 2 (1994) pp. 101–126.

* cited by examiner

*Primary Examiner*—Wayne Amsbury
*Assistant Examiner*—Thuy Pardo
(74) *Attorney, Agent, or Firm*—Burns, Doane, Swecker & Mathis LLP

(57) ABSTRACT

The present invention relates to a method of performing a schema change within a data-base, where the schema change is a complicated schema change, such as a complicated soft schema change, which results in the compatibility of a first schema version, before the schema change, with a second schema version, after the schema change, or a complicated hard schema change which renders a first schema version, before the schema change, incompatible with a second schema version after the schema change. The execution of a schema change is, according to the method, divided into a number of phases (1, 2, 3, 4, 5). According to one embodiment, a schema change is divided into three phases, a preparatory phase (1), a scanning phase (2), and a terminating phase (3). According to another embodiment, two further phases may be carried out between the scanning phase (2) and the terminating phase (3). These further phases are an evaluating phase (4) and a decision phase (5).

27 Claims, 4 Drawing Sheets

METHOD FOR PERFORMING COMPLICATED SCHEMA CHANGES WITHIN A DATABASE

FIELD OF INVENTION

The present invention relates to a method for performing schema changes within a data-base.

The present invention relates in particular to a method of performing a complicated schema change, regardless of whether the change is soft or hard. It will be understood, however, that the inventive method can be applied equally as well to effect a simple schema change.

BACKGROUND OF THE INVENTION

It has long been known to use in data-bases tables that are continuously updated or changed in different ways by different transactions. Such changes are called schema changes. There are also transactions that do not result in a schema change.

By schema is meant the prevailing configuration of tables in the data-base. This configuration may include the format of tables, i.e. table names, properties, fragmentation and different safety aspects;

the attributes allocated to different table columns, i.e. the type of information the attributes can store;

what keys exist, i.e. how external references are translated to internal references;

what foreign keys are found, i.e. the nature of different links between tables;

what different indexes are found, i.e. what search paths are found to different attributes in a table;

what triggers are coupled to a table, i.e. the special events that start, "trigger", another event, such that the change of data in a table triggers updating of another table in accordance with the change and in accordance with an existing key, possibly a foreign key.

The term schema, however, implies much more than what has been described above, but these meanings of the term, however, are some of the meanings that will be used in conjunction with the following description of the present invention.

In a distributed data-base, different tables are divided into a plurality of different fragments. Such a fragment includes, in turn, a number of copies or replicas of the same part of the table. Different fragments and their respective copies are physically found in different nodes in a system of mutually co-operating computers. The reliability of the system is improved by spreading the various copies belonging to a fragment, since this makes information available somewhere in the system, even though one or more system nodes should crash.

Schema changes within distributed data-bases can thus be relatively complicated, since all copies of a fragment affected by a schema change must be updated according to the change.

Schema changes in a data-base are based on different conditions and often include a number of different participants, causing a schema change to generate changes in different tables and/or, when the data-base is a distributed data-base, in different parts, fragments, of one or more tables in the data-base.

A schema change results in a change in the conditions for all users of the data-base and also the conditions for transactions between these users. Mention can also be made of different schema versions where a schema change results in the replacement of a first schema version with a second schema version.

Schema changes can be divided into different categories. Firstly, schema changes can be "simple" or "complicated", and, secondly, can be "soft" or "hard" changes. These change characteristics are partially independent of each other. Complicated schema changes can either be hard or soft, whereas simple schema changes are always soft.

Simple schema changes solely change the schema and not data within affected tables. Complicated schema changes alter both the schema and the data in one or more tables.

Put simply, the first and second schema versions are mutually compatible in a soft schema change. The second schema version is not compatible with the first schema version, however, in the case of a hard schema change.

By compatibility is meant that transactions according to the first schema version are able to update data in tables according to the second schema version, via mapping or a function, and transactions according to the second schema version can update data in tables according to the first schema version, via mapping or a function.

Thus, soft schema changes where preceding and following schema versions are compatible with one another enable transactions to be carried out simultaneously in accordance with both schema versions.

In the case of hard schema changes, the mapping or the function whereby tables in the second schema version can be updated with data from the first schema version, or vice versa, is not invertible, in other words tables in the first schema version cannot be updated with data from the second schema version, or vice versa.

Thus, all commenced transactions that affect units which, in turn, are affected by a hard schema change must be terminated in accordance with the first schema version before a schema change can be commenced. Only when the schema change has been completed can transactions begin in accordance with the second schema version.

Thus, no transactions according to the second schema change can be commenced during the time taken to terminate ongoing transactions and to carry out the schema change concerned. These transactions must wait for the termination of transactions according to the first schema version and for the schema change to be carried out, resulting in a considerable time loss.

Complicated schema changes require a change in several phases, since these changes affect both data and schema per se. Complicated schema changes include a number of mutually sequential schema changes and transactions.

The following publications describe known techniques concerning methods of performing schema changes, and also disclose various problems and encountered in this field.

"Axiomatization of Dynamic Scheme Evolution in Objectbases", 11th International Conference on Data Engineering, Mar. 1995, pp. 156–164, by R. J. Peters and M. T. Özsu.

"Beyond Schema Evolution to Data-base Reorganization", Proc., ACM OOOPSLA/ECOOP '90, pp. 67–76, Ottawa, Canada, Oct. 1990, by B. S. Lerner and A. N. Habermann.

"Type Evolution Support for Complex Type Changes", Technical Report UM-CS-94-71, University of Massachusetts; Amherst, Oct. 31, 1994, by B. S. Lerner.

"Schema Evolution and Integration, Distributed and Parallel Data-bases", Vol. 2, Jan. 1, 1994, ISSN 0926-8782, by S. M. Clemen.

It should also be mentioned that the use of so-called SAGA transactions in conjunction with data-bases is known in this field. In this regard, a first transaction can be performed with the possibility of utilising a following second transaction which will undo the changes caused by the first transaction.

With regard to the earlier standpoint of techniques in this particular field, it can be mentioned that, when changing software within a computer system, it is known to install the new software in parallel with the old software.

Subsequent to this installation, the new software can be evaluated or tested before the old software is removed. Should the test show that the new software does not function satisfactorily, the software can be removed and the old software again taken into use. If the test shows that the new software functions satisfactorily, the new software is taken into use and the old software removed. US-A 5,410,703 gives an example of such a method.

SUMMARY OF THE INVENTION

TECHNICAL PROBLEMS

When considering the state of the prior art as described above, it will be seen that a technical problem is one of providing a method for performing complicated schema changes within a data-base.

Another technical problem is one of providing a method with which complicated schema changes, such as complicated soft schema changes or such as complicated hard schema changes, can be carried out and which enables a reduction in the time loss that occurs in complicated hard schema changes due to a system stop while waiting for the performance of transactions according to the first schema version to be completed and while waiting for the actual schema change to be effected.

Another technical problem is one of enabling complicated schema changes to be divided into different phases, where respective phases can, in themselves, comprise a simple schema change or a table update.

Another technical problem resides in the provision of a method which will take into account whether the schema change is a soft change or a hard change, but which will function in both instances.

Another technical problem is one of providing a method that permits the second schema version to be evaluated with respect to a desired function prior to removing the first schema version.

Another technical problem is one of providing a method that enables a newly implemented software to be evaluated in combination with the schema change required in conjunction with implementation of new software, where said evaluation can be used as the basis of a decision as to whether implementation of the software and the schema change caused thereby shall be completed or not.

Another technical problem is one of providing a method in which a return to the first schema version can be made when it is found that the second schema version does not meet requirements.

Another technical problem is one of providing a method for handling an interruption in a complicated schema change, and in which the schema change can be continued or a return to the original schema version can be made despite the interruption.

SOLUTION

With the intention of solving one or more of the aforesaid technical problems, the present invention provides a method of performing in a data-base a complicated schema change, such as a complicated soft schema change where a first schema version prior to the schema change is compatible with a second schema version after the schema change, or a complicated hard schema change where a first schema version before said schema change is incompatible with a second schema version after said schema change.

It is particularly proposed that the performance of such a schema change is divided into a number of phases.

With the intention of providing a general method for different complicated schema changes, it is proposed in accordance with the invention that a complicated schema change can be divided into three phases.

A first phase comprises a preparatory phase that includes the creation of conditions for the commencement of transactions according to the second schema version while retaining conditions for completing transactions according to the first schema version.

With the intention of transferring data from the first schema version to the second schema version, a second phase comprises a scanning phase that includes data transfer according to the first schema version to data according to the second schema version.

The full schema change is terminated with a third phase that comprises a terminating phase which includes the removal of those units that shall not remain upon completion of a schema change.

With the object of enabling evaluation of the function of the second schema version and a return to the first schema version to be made, it is proposed in accordance with the invention that two intermediate phases can be used between the scanning phase and the terminating phase.

A first intermediate phase is comprised of an evaluating phase in which certain evaluating transactions are performed in accordance with the second schema version, whereby the function of said second schema version can be evaluated.

This phase is followed by a second intermediate phase comprised of a decision phase in which it is decided whether the schema change shall be completed or aborted, this decision being based on the result of the evaluating phase.

When the complicated schema change is a soft schema change and the object is to enable the first and the second schema versions to operate in parallel, it is proposed that the preparatory phase includes the application of different triggers, keys, foreign keys and/or indexes whereby the second schema version can be updated in accordance with transactions that affect the first schema version and triggers, keys, foreign keys and/or indexes whereby the first schema version can be updated according to transactions that affect the second schema version.

In this case, the evaluating transactions may be ordinary transactions according to the second schema version.

Provided that the change is a soft schema change, ordinary transactions according to the second schema version can be allowed to start immediately upon completion of the data transfer, or when the intermediate phases are selected, immediately a decision has been made to complete the schema change in the decision phase, even though transactions according to the first schema version are still ongoing.

When the complicated schema change is a complicated hard schema change, it is proposed in accordance with the invention that the preparatory phase includes the application of different triggers, keys, foreign keys and/or indexes whereby the second schema version can be updated in accordance with transactions that affect the first schema version, or the application of triggers, keys, foreign keys and/or indexes whereby the first schema version can be updated according to transactions that affect the second schema version, depending on the direction in which data can be transferred in accordance with prevailing compatibility between the two schema versions.

Since the first and the second schema version are not compatible with one another, it is proposed in accordance with the present invention that evaluating transactions are comprised of especially designed control-transactions that can be performed in accordance with the second schema version with no detrimental effect to the first schema version.

In this particular case, ordinary transactions according to the second schema version are allowed to start immediately all transactions according to the first schema version are accomplished and, if the intermediate phases are chosen, immediately a decision is made in the decision phase to complete the schema change.

The terminating phase is commenced after all transactions according to the first schema version are accomplished and, if the intermediate phases are chosen, according to the decision reached in the decision phase regarding the decision to accomplish the schema change, regardless of whether the schema change is a hard change or a soft change.

The terminating phase also includes the removal of all triggers, keys, foreign keys, indexes and/or other units that are not used by the schema version that prevails after the schema change.

In order to enable the evaluation of software that shall be implemented, it is proposed in accordance with the present invention that the schema change required when implementing new software is carried out in parallel with the implementation According to one embodiment of the invention, those transactions that are generated by the new software as evaluating transactions in the evaluating phase of the schema change are used when checking the new software.

The result obtained with the evaluating phase is used as a basis for a decision as to whether implementation of the new software shall be finalised or not, and also a decision as to whether or not; the schema change shall be completed.

With the intention of enabling the first schema version to be restored or the schema change to be completed in the event of an interruption, it is proposed in accordance with the invention that the schema change includes storage of information in a so-called SAGA table.

According to the invention, this information includes both UNDO-information and REDO-information, where the UNDO-information includes the information required to re-establish the first schema version in the event of an aborted schema change for any reason in the preparatory, scanning, evaluating or decision phase, and where the REDO-information includes the information required to finalise or complete the schema change in the event of an aborted schema change in the terminating phase for some reason or another.

According to one embodiment of the invention, the preparatory phase includes the storing of necessary UNDO-information, and the scanning phase or, when the intermediate phases are chosen, the decision phase includes storing necessary REDO-information.

ADVANTAGES

Those advantages primarily afforded by an inventive method reside in the possibility of performing complicated schema changes, regardless of whether these changes are soft or hard, wherein the schema change and, in certain cases, also transactions according to the second schema version can be commenced prior to termination of all transactions according to the first schema version. Practically the whole of the schema change can be carried out, with the exception of the terminating phase, before the transactions according to the first schema version are terminated, which provides significant time gains in relation to when it is necessary to wait for all transactions according to the first schema version to be terminated before the schema change can be commenced.

Another advantage provided by the present invention is that it is possible to evaluate the second schema version before the first schema version is lost. The present invention also makes it possible to return to the first schema version when evaluation of the second schema version shows that this version does not function satisfactorily.

The present invention also enables a schema change to be completed or aborted, and a return made to the first schema version in the event of an involuntary interruption of the schema change, such as in the event of a crash of the hardware that stores or handles tables affected by the schema change.

The primary characteristic features of a method according to the present invention are set forth in the characterizing clause of the following claim 1.

BRIEF DESCRIPTION OF THE DRAWINGS

So that the invention will be more readily understood and further features thereof made apparent, the invention will now be described in more detail with reference to exemplifying embodiments thereof and also with reference to the accompanying drawings, in which.

DETAILED DESCRIPTION OF PREFERRED EMBODIMENTS

Figure 1:
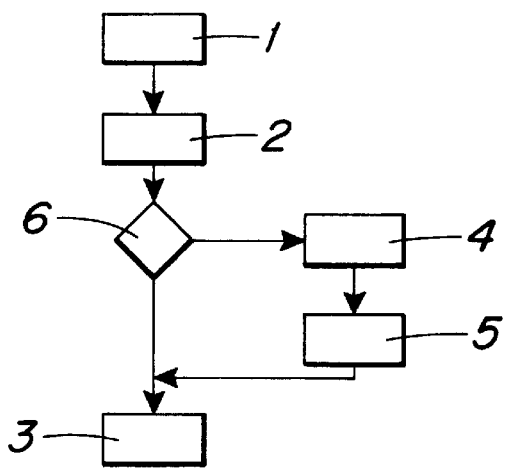
FIG. 1 is a flowchart illustrating a method according to the present invention.

Referring to the flowchart in FIG. 1, illustrating a method according to the present invention.

The schema change according to this method causes a first schema version to be changed to a second schema version. As shown in FIG. 1, the schema change is performed by dividing the change into a number of phases 1, 2, 3, 4, 5.

In accordance with the inventive concept, the complicated schema change is divided into three phases 1, 2, 3. The method can be allowed to include two further, intermediate phases 4, 5 so as to enable the second schema version to be evaluated before removing the first schema version.

The use of only three basic phases 1, 2, 3 provides a faster method in certain cases, although uncertainty will increase since the use of solely three basic phases does not enable the second schema version to be evaluated before being taken into use. Furthermore, it may be difficult to use the two intermediate phases in the case of some hard schema changes.

The first phase 1 is a preparatory phase in which conditions are generated which enable transactions according to the second schema version to be commenced, while retaining conditions that allow transactions according to the first schema version to continue.

The second phase 2 is a scan phase which includes the transfer of data according to the first schema version to data according to the second schema version.

The third phase 3 is a terminating phase, which includes the removal of those units that shall not be left subsequent to completing a schema change.

The aforesaid phases 1, 2, 3 are the three basic phases.

The first intermediate phase 4, which is selectable at 6 although not absolutely necessary, is an evaluating phase. This phase is the first of the two intermediate phases and includes performing certain evaluating transactions in accordance with the second schema version, whereby the function of said second schema version can be evaluated.

In a schema change, the second schema version can be evaluated to different extents, depending on what is possible and desirable.

In some soft schema changes, it may be possible to carry out a total system test that includes performing a number of evaluating transactions, whereby the function of different users and their possible requirements are evaluated.

It is possible that a function test that includes a smaller number of specific transactions will suffice.

In the case of some hard schema changes, it might only be possible to carry out simple, basic tests or that no tests at all can be carried out, depending on the extent to which evaluating transactions can be performed in the second schema version without creating inconsistencies between the two schema versions.

The second intermediate phase 5 is carried out when the evaluating phase 4 is chosen 6 and is a decision phase in which a decision is taken as to whether the schema change shall be completed or aborted. The decision is based on the result from the evaluating phase 4.

When the complicated schema change is a soft change, it is proposed in accordance with the invention that the preparatory phase 1 includes the application of different triggers, keys, foreign keys and/or indexes.

These triggers and keys enable the second schema version to be updated in accordance with transactions that affect the first schema version. Triggers, keys, foreign keys and/or indexes are also applied whereby the first schema version can be updated according to transactions that affect the second schema version.

This means that a transaction according to one schema version will trigger updating of the other schema version in accordance with the transaction and applied keys regardless of whether the triggering transaction is in accordance with the first schema version or in accordance with the second schema version.

According to the concept of using solely the three basic phases, ordinary transactions according to the second schema version can be allowed to start immediately the scan phase 2 has been carried out, i.e. when data from the first schema version has been transferred to the second schema version, even though transactions according to the first schema version might still be ongoing.

When the complicated schema change is a hard schema change, it is proposed in accordance with the present invention that the preparatory phase 1 includes the application of different triggers, keys, foreign keys, and/or indexes which enable the second schema version to be updated in accordance with transactions that affect the first schema version, or the application of triggers, keys, foreign keys and/or indexes whereby the first schema version can be updated in accordance with transactions that affect the second schema version.

In this case, the keys can only function in one direction due to the lack of compatibility between the two schema versions.

In the case of a hard schema change, ordinary transactions according to the second schema version are allowed to commence as soon as all transactions according to the first schema version are completed.

The terminating phase is begun when all transactions according to the first schema version have been completed, regardless of whether the schema change is a hard or a soft change.

When using the two intermediate phases 4, 5 in soft schema changes, it is proposed in accordance with the invention that the evaluating transactions may comprise a choice of ordinary transactions according to the second schema version.

Ordinary transactions according to the second schema version can then be allowed to start immediately a decision to complete the schema change has been reached in the decision phase 5, even though transactions according to the first schema version may still be ongoing.

When using the two intermediate phases 4, 5 in hard schema changes, it is proposed in accordance with the invention that the evaluating transactions are specially designed control-transactions which are designed to be performed in accordance with the second schema version to no detrimental effect of the first schema version or the data-base.

By detrimental effect is meant that no inconsistencies will occur between the two schema versions, meaning that the control-transactions must be configured in a manner such that information within the two schema versions will be equal or consistent, despite carrying out said control-transactions.

Ordinary transactions according to the second schema version can then be allowed to start immediately a decision is reached to continue the schema change in the evaluating phase 5, and immediately all transactions according to the first schema version are completed.

It is also proposed in accordance with the present invention that when using the two intermediate phases 4, 5, the termi nating phase 3 is begun in accordance with the decision reached in the decision phase 5 and, if the decision is to complete the schema change, the change is carried out after all transactions according to the first schema version have been completed.

Regardless of whether the two intermediate phases are used or not, and regardless of any decision that may be made in the decision phase, any triggers, keys, foreign keys, indexes and/or other units that are not used by the second schema version are removed when the schema change is completed, while the decision phase includes the removal of any triggers, keys, foreign keys, indexes and/or other units that are not used by the first schema version, when the schema change is interrupted or aborted.

So that the present invention will be more readily understood, a number of concrete examples of schema changes and how these changes can be divided into different phases in accordance with the aforegoing will now be described.

Figure 2:
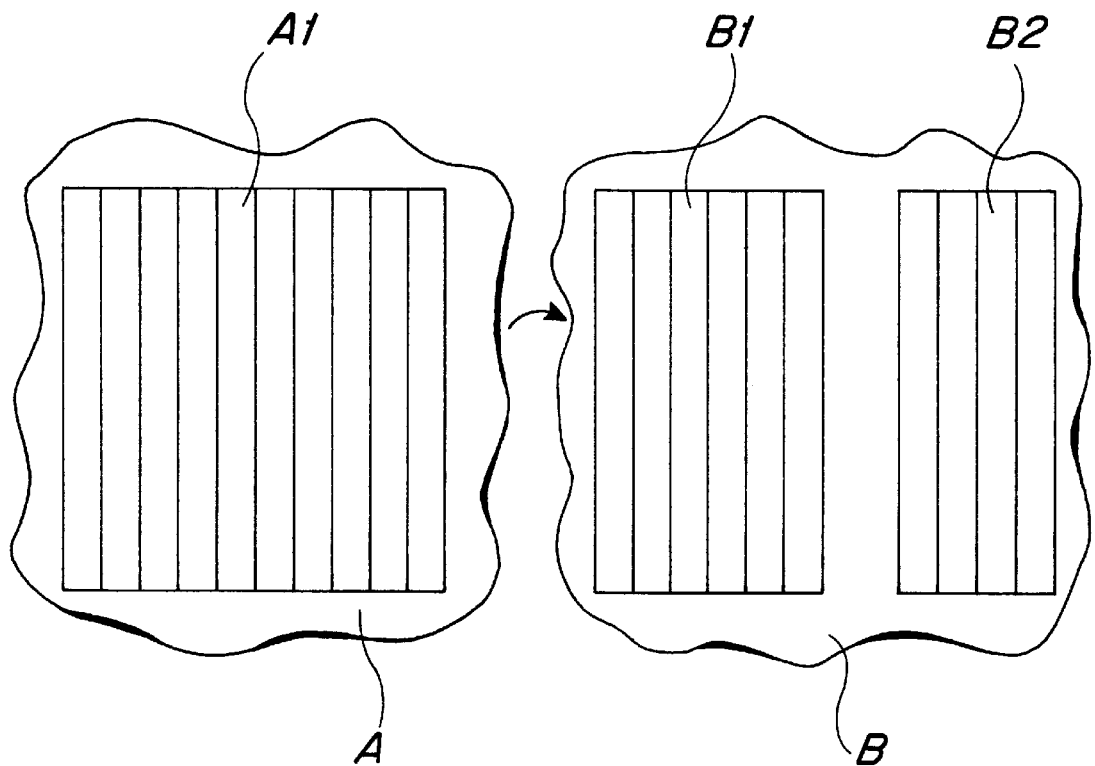
FIG. 2 is a schematic illustration of a first and a second schema version associated with an example of a soft schema change.

The first example is illustrated through FIG. 2 and involves vertical division of a table Al having ten attributes that constitutes the first schema version A into two tables B1, B2 that have respectively six and four attributes and that forms the second schema version B, where the first six attributes in the old table A1 shall form the first new table B1 and the last four attributes in the old table A1 shall form the second new table B2. This is a complicated soft schema change.

The above change can be performed in different ways and the following description concerns solely one example of how such a schema change can be performed in accordance with the present invention.

Figures 3, 4:
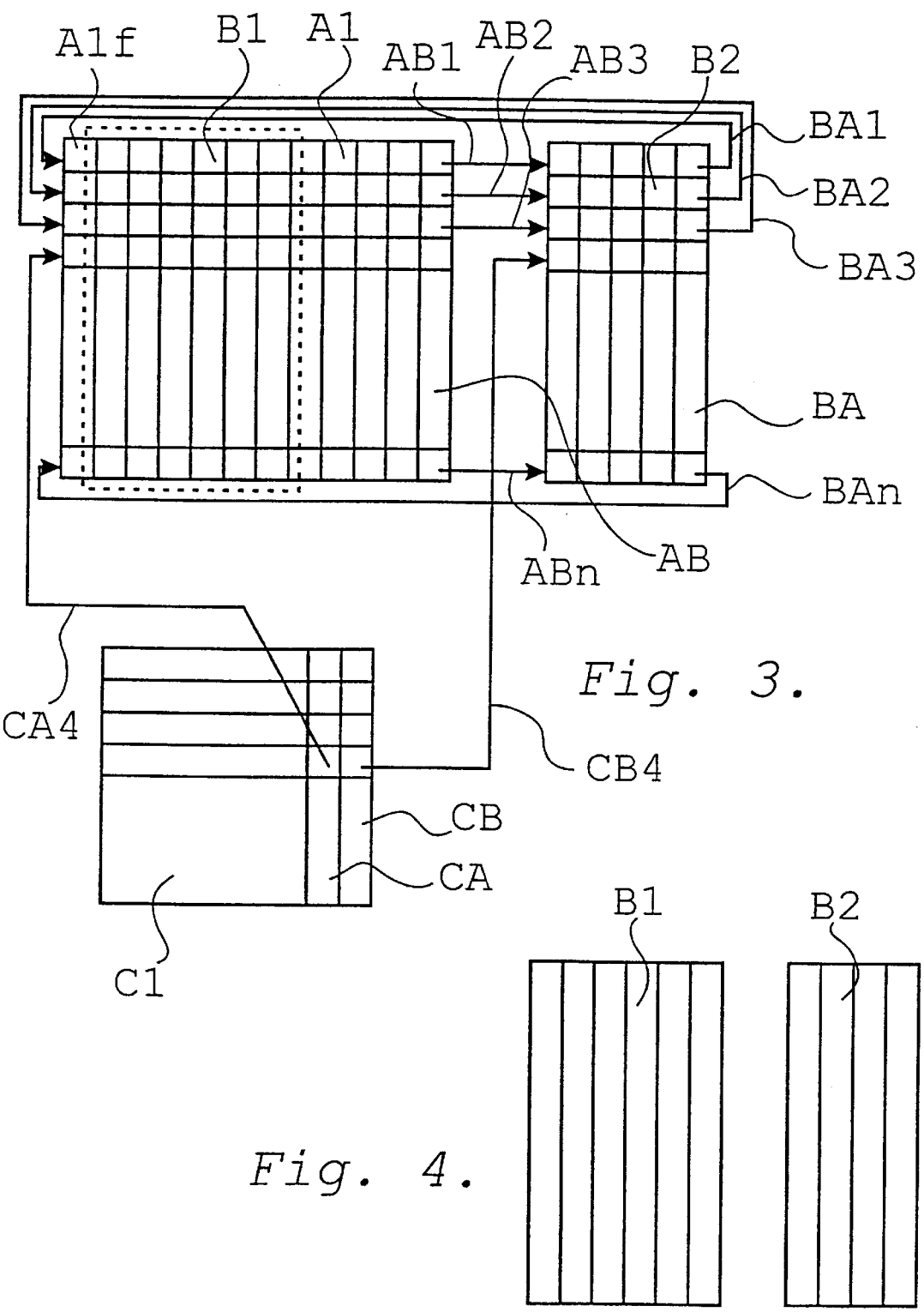
FIG. 3 is a schematic illustration of part of the performance of a schema change according to FIG. 2, and shows the handling of a foreign table.
FIG. 4 illustrates schematically a possible result of a schema change according to FIG. 2.

Preparatory phase 1: As shown in FIG. 3, th is preparatory phase includes a schema change which results in the creation of a completely new and empty table B2 having four attributes.

The old table A1 having ten attributes remains intact. This is a soft schema change.

Triggers and keys AB1, AB2, AB3, . . . , ABn required to transfer data from the old table A1 to the newly created table B2 is created in the old table A1 through a further attribute AB for updating the newly created table B2 in respect of transactions to the old table A1 according to the first schema version A.

In practice, this further attribute AB may be comprised of several different attributes, although it is shown as a single attribute in the Figure for the sake of simplicity. The manner in which these attributes shall be created will be obvious to one skilled in this art. The same applies to other additional attributes created in the same way in the following description.

Triggers and keys BAB, BA2, BA3, . . . , BAn required to update the old table A1 in respect of transactions to the new table B2 according to the second schema version B are also created through an additional attribute BA in the newly created table B2.

The first six attributes in the old table A1 also form the six attributes in the new table B1. This means that no triggers or keys are needed for an updating between the first six attributes in the old table A1 and the first new table B1, since transactions according to the second schema version B that will affect the first new table B1 will act directly on the first six attributes in the old table A1, and since transactions according to the first schema version A that will affect the first six attributes in the old table A1 will act directly on the first new table B1.

Each row in the existing table A1 is allocated a check-flag Alf which is set to "0" and changed to "1" when information according to the first schema version A in this row has been transferred to the second schema version B.

This check-flag can also be implemented by setting the key AB1, AB2, AB3, . . . , ABn in the attribute AB to "NULL" prior to having transferred information from respective rows to the second schema version B, whereafter respective keys AB1, AB2, AB3, . . . , ABn are set to point to the correct row in the table B2 in conjunction with making a transfer for respective rows.

A pointer from the attribute AB having the value "NULL" for a specific row, or line, thus shows that information from the old table A1 to the newly created table B2 intended for corresponding rows in the newly created table B2 has still not been transferred, and that corresponding rows in the newly created table B2 shall not be updated when changing this row in the old table A1.

Scanning phase 2: The last four attributes in the old table A1 are scanned and relevant information is transferred to the second new table B2, in accordance with applied keys AB1, AB2, AB3, . . . , ABn and the check-flag Alf, when such is used, is set from "0" to "1".

The second new table B2 is continuously updated in accordance with those transactions that are still ongoing in accordance with the first schema version and which concerns the last four attributes in the old table A1. When scanning and transferring of information has been completed, transactions according to the second schema version B may be allowed to commence parallel with transactions according to the first schema version A that have still not been completed, where those transactions that concern the four attributes are carried out to the second new table B2, and where those transactions that concern the six attributes in the first new table B1 are carried out to the six first attributes in the old table A1.

When transactions according to the second schema version B are allowed to start, the old table A1 is updated in respect of those transactions that affect the second newly created table B2 through the keys BA1, BA2, BA3, . . . , BAn in the attribute BA in the newly created table B2.

Thus, consistency is obtained between the two schema versions A, B, and correct data is available to ensure that the old table A1 will contain correct data for any transactions according to the first schema version A that may still be uncompleted and that concern the last four attributes in the old table A1.

Evaluating phase 4: A limited number of transactions according to this second schema version are allowed to start, in order to establish whether or not the second schema version functions correctly.

Decision phase 5: A decision to complete, or finalise, the schema change is made when the second schema version functions correctly. An incorrect function results in a decision to abort the schema change.

When a decision to complete the schema change is made, ordinary transactions according to the second schema version B are allowed to take place at the same time as remaining transactions according to the first schema version A are completed.

When a decision to abort the schema change is made, the ongoing transactions according to the first schema version A are completed and no ordinary transactions according to the second schema version B are commenced.

Terminating phase 3: When a decision is made to complete the schema change in the decision phase 5, a termination of all ongoing transactions according to the first schema version A is awaited. That part of the old table A1 which is not used in the second schema version B, i.e. the last four attributes, are then removed in accordance with FIG. 4.

If a decision to abort the schema change is made in the decision phase 5, the newly created table B2 is removed and the old table A1 kept intact. This can be done without waiting for termination of all ongoing transactions according to the first schema version A.

Regardless of the decision made in the decision phase 5, all check-flags ALf, triggers, and keys in the further attributes AB, BA created for updating respective tables in transactions that concerns the different tables are removed, unless they shall be used in the final schema version.

Thus, the complicated soft schema change involving a vertical division of a table has been divided into five phases, of which the first and the last phase are simple schema changes, where the second phase solely includes the transfer of information, and where the third and the fourth phase constitute a check on the second schema version, which permits transactions according to both the first and the second schema versions A, B to be processed simultaneously.

The second example is confirmed with a change of an attribute in a table, which may be a complicated hard schema change. In the illustrated case, this change is, in fact, a complicated hard schema change.

Figure 5:
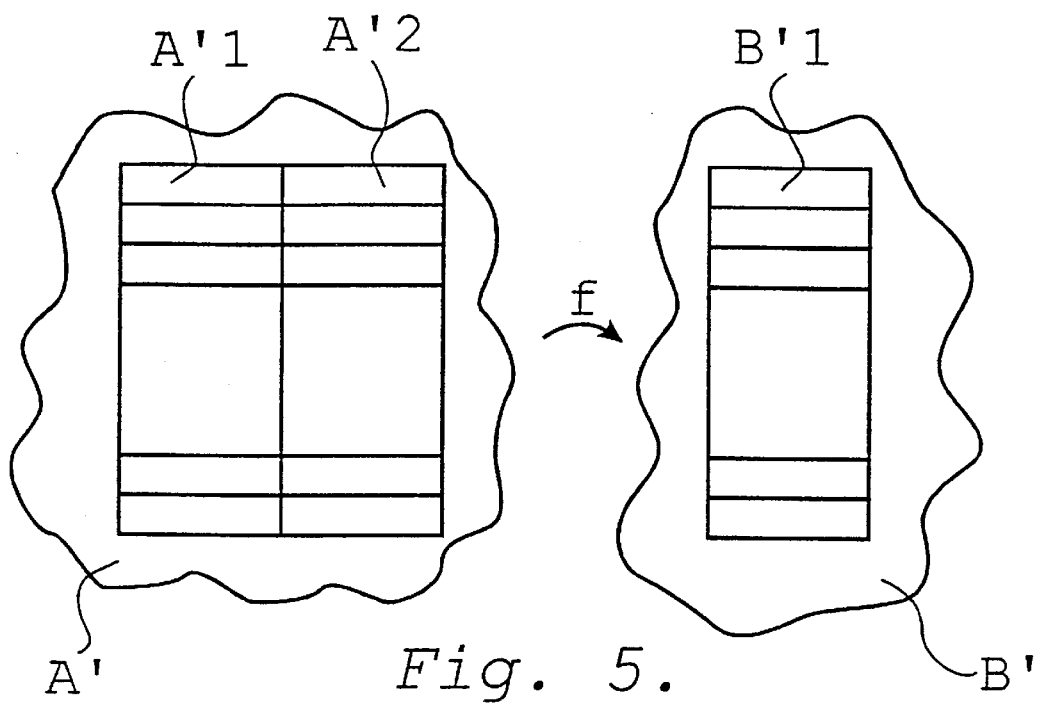
FIG. 5 is a schematic illustration of a first and a second schema version associated with an example of a hard schema change.

FIG. 5 shows a table that includes an attribute A'1 which indicates the hourly wage of different persons, while another attribute A'2 indicates the number of hours that respective persons have worked over the course of one month. This is the first schema version A'.

The change to be made involves the replacement of these two attributes A'1, A'2 with an attribute B'1 which indicates the monthly salary, or wages, of respective persons. This is the second schema version B'.

This example includes a transfer function "f" from the first schema version A' to the second schema version B'. The function "f" is: "monthly salary"="hourly salary"* "number of hours".

In this case, there is no possibility of transferring the information in the second schema version B', i.e. the "monthly salary" B'1, to the first schema version A', i.e. "hourly salary" A'1 and "number of hours" A'2 respectively, since it is not know whether a change in "monthly salary" B'1 is due to a change in the "hourly salary" A'1 or in the "number of hours" A'2, or possibly in both.

The two schema versions are therefore incompatible with one another and the schema change is thus a hard schema change.

In this example, only concerned attributes are shown in the Figures. It will be understood, however, that these attributes may well be, and probably are, part of a table that includes several attributes.

Figure 6:
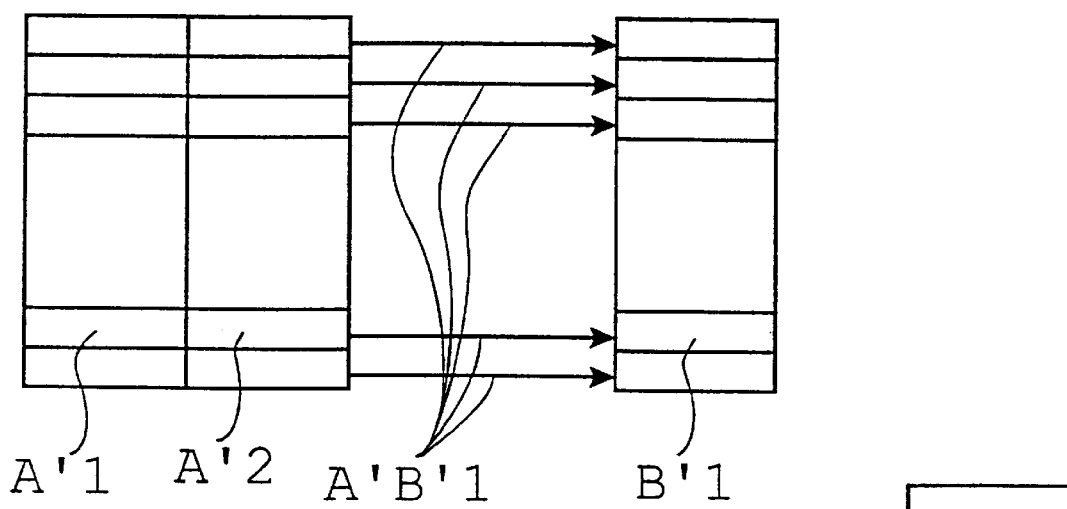
FIG. 6 is a schematic illustration of part of the performance of a schema change according to FIG. 5.

Preparatory phase 1: FIG. 6 shows how an attribute B'1 in the existing table is created, this attribute constituting the new attribute "monthly salary" according to the second schema version B'. Triggers A'B'1 are created whereby a change in any row in the attribute "hourly salary" A'1 and "number of hours" A'2 also results in an updating of corresponding rows in the attribute "monthly salary" B'1.

Scanning phase 2: This phase involves scanning of the information in respective rows in the attribute "hourly salary" A'1 and the "number of hours" A'2, whereafter correct information is placed in the attribute "monthly salary" B'1 through the medium of the created function "f" and the trigger A'B'1. This is commenced before all transactions according to the first schema version A' have been completed.

Evaluating phase 4: Special evaluating transactions according to the second schema version B' are commenced. These transactions must have no deleterious effect on the information according to the first schema version A', in other words they must not generate errors in the data-base, such as inconsistencies between the two schema versions A', B'.

One such evaluating transaction may be the insertion of a current, correct monthly salary in the attribute "monthly salary" B'1 as it is intended to be inserted in accordance with the second schema version B'. The value of the "monthly salary" B'1 shall be correct in relation to corresponding values of "hourly salary" A'1 and "number of hours" A'2 in order for the information to be correct in both schema versions A'and B'.

It will thus be seen that the transfer of information from the first schema version A' to the second schema version B'in the scanning phase 2 involves a plurality of evaluating transactions.

This example provides only a limited function of tests of the second schema version B', through the evaluating transactions.

Decision phase 5: A decision to complete the schema change is made, when a correct function is established. An incorrect function results in a decision to abort the schema change.

When a decision to complete the schema change is made, ordinary transactions according to the second schema version B' are allowed to start as soon as all transactions according to the first schema version A' have been completed.

If a decision is made to abort the schema change, the ongoing transactions according to the first schema version A' are continued and no transactions according to the second schema version B' are commenced.

Terminating phase 3: When a decision is made in the decision phase 5 to complete the schema change, a termination of all transactions according to the first schema version A' is awaited. All of the aforesaid processes can thus be carried out simultaneously as transactions continue according to the first schema version A', despite the total schema change constituting a hard schema change.

Figure 7:
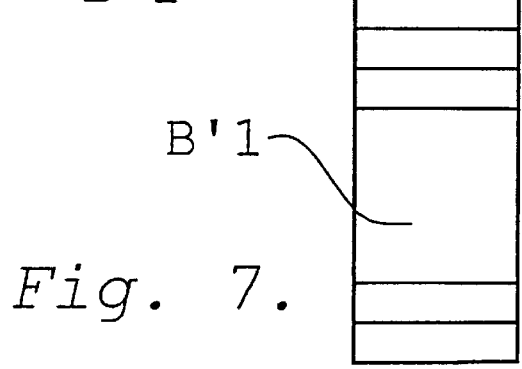
FIG. 7 is a schematic illustration of a possible result of a schema change according to FIG. 5.

When the transactions according to the first schema version are terminated, ordinary transactions according to the second schema version B' are commenced. As evident from FIG. 7, the attributes "hourly salary" A'1 and "number of hours" A'2 that are not used in the second schema version B' are removed.

If a decision is made to abort the schema change in the decision phase 5, the newly created attribute B'1 is removed. This can be carried out without waiting for the termination of ongoing transactions according to the first schema version A'.

Regardless of the decision made in the decision phase 5, all triggers A'B'1 created for updating the attribute "monthly salary" B'1 in transactions that affected the attribute "hourly salary" A'1 and "number of hours" A'2 are removed.

The aforesaid complicated hard schema change has thus been divided into five phases of which the first phase and the last phase are simple schema changes and of which the second phase merely includes the transfer of information, said phases allowing transactions according to the first schema version A' and an advanced implementation of the second schema version B' to be carried out simultaneously.

In the aforegoing, schema changes have been described with reference to two examples in which only tables that are affected directly by the schema change have been described. As will be seen from FIG. 3, however, a schema change can also affect tables other than those that are affected directly by the schema change, so-called foreign tables, due to the fact that these tables co-operate with the table or tables that are affected by the schema change, in one way or another. The keys through which this co-operation takes place are called foreign keys.

In the illustrated case, which is based on the soft schema change described above and illustrated in FIGS. 2, 3 and 4, this co-operation consists in that a change of one element in the foreign table C1 also results in a change in the old table A1 according to the first schema version, and where a corresponding change in the foreign table C1 also will result in a change in both the first new table B1 and the second new table B2.

The foreign keys CA4 in the attribute CA present according to the first schema version A are the links that connect the foreign table C1 with the old table A1.

In addition to the aforedescribed triggers and keys, there are also created in the preparatory phase of the schema change triggers and foreign keys CB4 that enable the foreign table C1 and the second new table B2 to mutually co-operate. The foreign table C1 also co-operates with the first new table B1 through the foreign keys belonging to the attribute CA.

Only the fourth foreign key within respective attributes CA and CB is shown, for the sake of simplicity. It will be understood, however, that these attributes include all keys required for the aforesaid co-operation.

The foreign keys that are not used by the schema version that is applicable after the change are removed in the terminating phase, depending on whether the change is completed or not.

This description of how foreign tables and foreign keys can be handled has been given by way of example only. It will be obvious that this handling procedure will vary greatly with different schema changes. It can also be carried out in different ways in one and the same example, such as in the example described above.

Because a schema change will also affect different applications of the data-base, it is suitable to synchronise schema changes with a possible change of software or an implementation of new software in the data-base or of a data-base user.

Figure 8:
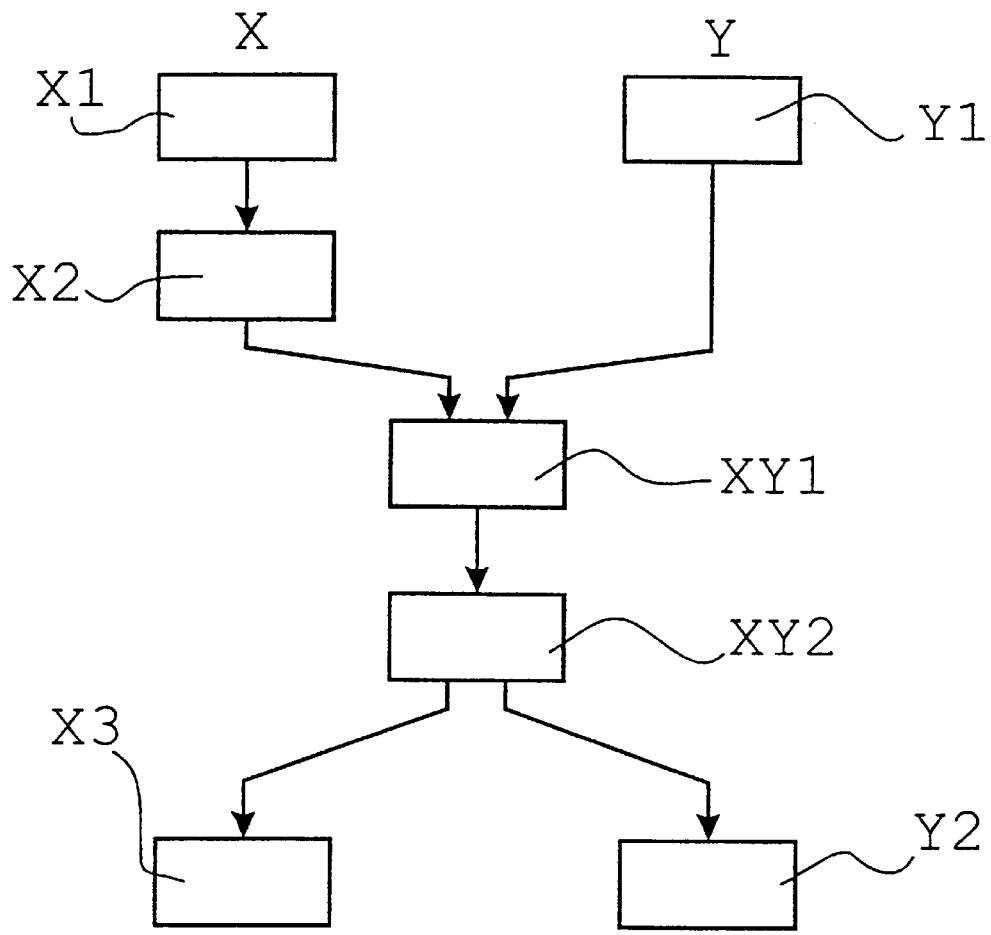
FIG. 8 is a flowchart illustrating a combined schema change and software change.

The flowchart in FIG. 8 is intended to illustrate how a software change Y is performed parallel with a schema change X.

The schema change X involves a change from a first schema version A" to a second schema version B" and is begun with a preparatory phase X1 and a scan phase X2. An initial phase Y1 of the software change Y is commenced at the same time, this phase including implementation of software that is sufficient to evaluate the same.

An evaluating phase XY1 is then begun, and transactions which use the second schema version B" are generated by the new software Y and constitute the evaluating transactions in the evaluating phase XY1.

The evaluation carried out in the evaluating phase XY1 includes an evaluation of both the second schema version B" and the new software Y and their mutual co-operation.

A decision as to whether to complete the implementation of the new software Y or not is made in the decision phase XY2 on the basis of the result obtained in the evaluating phase XY1.

The schema change X and the software change Y are either completed or terminated in a terminating phase X3, Y2, in accordance with the decision reached in the decision phase XY2.

The present invention also provides an embodiment, which is a preferred embodiment, in which the schema change includes the storage of information in a so-called SAGA table.

Figure 9:
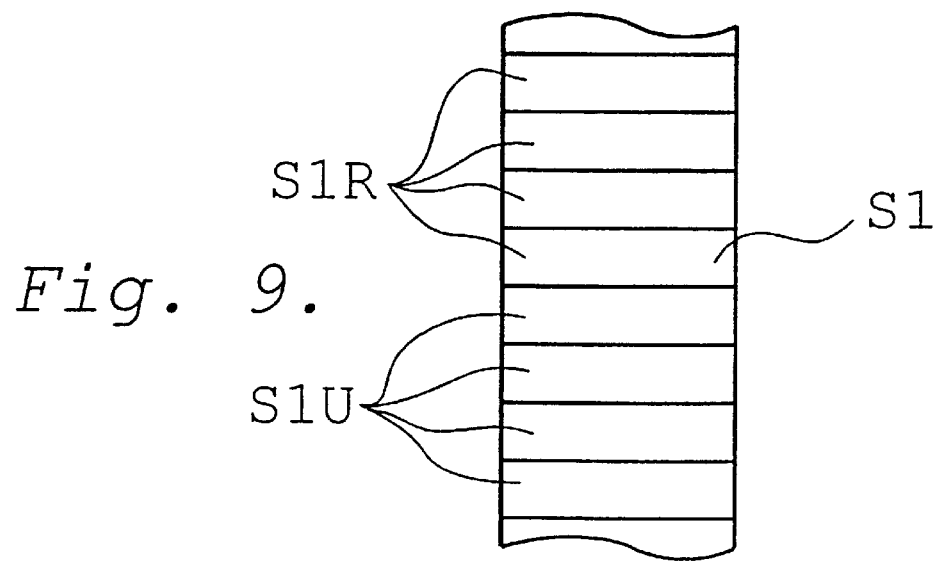
FIG. 9 illustrates schematically a SAGA table according to the present invention.

As illustrated in FIG. 9, a SAGA table is comprised of a data-base table S1 that includes information which enables a schema change to be completed or aborted in the event of one or more nodes crashing in a distributed data-base affected by a schema change.

According to the invention, a SAGA table S1 can also be used in a non-distributed data-base so as to provide the same possibilities of completing a schema change or re-setting the data-base to the first schema version in the event of a hardware crash during the schema change.

The purpose of a SAGA table S1 is to enable a schema change to be implemented in a way similar to the implementation of a SAGA transaction according to earlier known techniques. Implementation in conjunction with schema changes, however, is somewhat more complex due to the fact that a schema change includes a series of transactions which can result in different changes in both data and schema.

The information included by a SAGA table S1 is comprised of both UNDO-information S1U and REDO-information S1R, where the UNDO-information S1U includes the information required to reset the first schema version A in the event of the interruption of the schema change in the preparatory phase 1 or the scan phase 2 and possibly in the evaluating phase 4 or the decision phase 5 for some reason or other, and where REDO-information S1R includes the information required to complete the schema change should the schema change be interrupted in the terminating phase 3 for some reason or another.

An interruption of a schema change may be a planned interruption, for instance by a decision not to complete the schema change due to the fact that evaluation of the second schema version has shown that this version does not function satisfactorily.

An interruption, or stoppage, may also be unplanned and caused, for instance, by crashing of a node that is affected by a schema change in a distributed data-base, or some type of hardware crash in a non-distributed data-base.

If only the three basic phases 1, 2, 3 are used, it is proposed in accordance with the invention that the preparatory phase 1 includes the storage of REDO-information S1R, and that the scan phase 2 includes the storage of UNDO-information S1U.

On the other hand, if the two intermediate phases 4, 5 are also used, it is proposed that the preparatory phase 1 includes the storage of REDO-information S1R and that the evaluating phase 5 includes the storage of UNDO-information S1U.

According to the present invention, a SAGA table S1 may also be used in the updating of any secondary copies or a fully secondary data-base in conjunction with safety copying.

It will be understood that the invention is not restricted to the aforedescribed and illustrated exemplifying embodiments thereof and that modifications can be made within the scope of the inventive concept as defined in the following Claims.

What is clamed is:

1. A method of performing in a data-base a schema change, such as a complicated soft schema change where a first schema version prior to the schema change is compatible with a second schema version after the schema change, or such as a complicated hard schema change where a first schema version before said schema change is incompatible with a second schema version after said schema change, comprising the steps of:

dividing the complicated schema change into three phases, of which a first phase, a preparatory phase, comprises creating conditions which enable transactions according to said second schema version to be commenced while retaining conditions for enabling transactions according to said first schema version to continue, this first phase being a simple schema change;

a second phase, a scan phase, comprises the transmission of data according to said first schema version to data according to said second schema version; and of which a third phase, a terminating phase, comprises the removal of those units that shall not be present upon completion of a schema change, which is a simple schema change.

2. A method according to claim 1, where said complicated schema change is a complicated soft schema change, wherein said preparatory phase includes the application of different triggers, keys, foreign keys and/or indexes, whereby said second schema version can be updated with respect to transactions that affect said first schema version, and the application of different triggers, keys, foreign keys and/or indexes whereby said first schema version can be updated with respect to transactions that affect said second schema version.

3. A method according to claim 2, wherein ordinary transactions according to said second schema version are allowed to start immediately upon completion of said data transfer, even though transactions according to said first schema version should still be ongoing.

4. A method according to claim 1, wherein said complicated schema change is a complicated hard schema change, wherein said preparatory phase includes the application of different triggers, keys, foreign keys and/or indexes whereby said second schema version can be updated according to transactions that affect said first schema version, or the application of different triggers, keys, foreign keys, and/or indexes whereby said first schema version can be updated according to transactions that affect said second schema version.

5. A method according to claim 4, wherein ordinary transactions according to said second schema version are allowed to start immediately all transactions according to said first schema version have been completed.

6. A method according to claim 1, wherein said terminating phase is begun after all transactions according to said first schema version are completed.

7. A method according to claim 1, wherein said complicated schema change includes a two further phases; in that said two phases are positioned between said scan phase and said terminating phase, wherein a first intermediate phase, an evaluating phase, includes performing certain evaluating transactions according to said second schema version whereby the function of said second schema version can be evaluated; and wherein a second intermediate phase, a decision phase, includes deciding whether the schema change shall be completed or broken-off, this decision being based on the result of said third evaluating phase.

8. A method according to claim 2, wherein said evaluating transactions are specially configured control-transactions.

9. A method according to claim 2, wherein said evaluating transactions are ordinary transactions according to said second schema version.

10. A method according to claim 2, wherein ordinary transactions according to said second schema version are allowed to start immediately a decision is reached in said decision phase to complete said schema change even though transactions according to said first schema version are still ongoing.

11. A method according to claim 4, wherein said evaluating transactions are specially configured control-transactions that can be performed according to said second schema version with no detrimental effect on said first schema version.

12. A method according to claim 4, wherein ordinary transactions according to said second schema version are allowed to start immediately a decision is made in said evaluating phase to complete said schema change, and immediately all transactions according to said first schema version have been completed.

13. A method according to claim 7, wherein said terminating phase is begun in accordance with the decision reached in said evaluating phase and, if said decision is to complete said schema change, after all transactions according to said first schema version have been completed.

14. A method according to claim 2, wherein when said schema change is carried out, said terminating phase includes the removal of any triggers, keys, foreign keys, indexes and/or other units that are not used by said second schema version; and in that when said schema change is aborted, said terminating phase includes the removal of any triggers, keys, foreign keys, indexes and/or other units that are not used by said first schema version.

15. A method according to claim 7, in conjunction with a software change in which present software shall be replaced by new software, or where new software that has no earlier correspondence shall be implemented in said data-base or by a user of said data-base, wherein said schema change is synchronised with said software change; in that transactions that are generated by said new software constitute said evaluating transactions; in that evaluation in said evaluating phase includes evaluation of said second schema version, evaluation of said new software, and evaluation of their mutual co-operation; and that a decision as to whether to implement said new software and to carry out said schema change is made on the basis of the results obtained from said evaluating phase.

16. A method according to claim 1, wherein said schema change includes the storage of information in a SAGA table; in that said information includes both UNDO-information and REDO-information, where said UNDO-information includes the information required to re-set said first schema version in the event of a schema change being interrupted or aborted in said preparatory phase or said scan phase and possibly in an evaluating phase or a decision phase for some reason or other, and where said REDO-information includes the information required to complete said schema change in the event of said schema change being interrupted or aborted in said terminating phase for some reason or another.

17. A method according to claim 1, wherein said preparatory phase includes the storage of said UNDO-information; and in that said scan phase includes the storage of said REDO-information.

18. A method according to claim 7, wherein said preparatory phase includes the storage of said UNDO-information; and in that said evaluating phase includes the storage of said REDO-information.

19. A method according to claim 7, wherein said evaluating transactions are specially configured control-transactions.

20. A method according to claim 7, wherein said evaluating transactions are ordinary transactions according to said second schema version.

21. A method according to claim 7, wherein ordinary transactions according to said second schema version are allowed to start immediately a decision is reached in said decision phase to complete said schema changed even though transactions according to said first schema version are still ongoing.

22. A method according to claim 7, wherein said evaluating transactions are specially configured control-transactions that can be performed according to said second schema version with no detrimental effect on said first schema version.

23. A method according to claim 7, wherein ordinary transactions according to said second schema version are allowed to start immediately a decision is made in said evaluating phase to complete said schema change, and immediately all transactions according to said first schema version have been completed.

24. A method according to claim 4, wherein when said schema change is carried out, said terminating phase includes the removal of any triggers, keys, foreign keys, indexes and/or other units that are not used by said second schema version; and in that when said schema change is aborted, said terminating phase includes the removal of any triggers, keys, foreign keys, indexes and/or other units that are not used by said first schema version.

25. A method according to claim 7, wherein said schema change includes the storage of information in a SAGA table; in that said information includes both UNDO-information and REDO-information, where said UNDO-information includes the information required to re-set said first schema version in the event of a schema change being interrupted or aborted in said preparatory phase or said scan phase and possibly in an evaluating phase or a decision phase for some reason or other, and where said REDO-information includes the information required to complete said schema change in the event of said schema change being interrupted or aborted in said terminating phase for some reason or another.

26. A method according to claim 16, wherein said preparatory phase includes the storage of said UNDO-information; and in that said scan phase includes the storage of said REDO-information.

27. A method according to claim 16, wherein said preparatory phase includes the storage of said UNDO-information; and in that said evaluating phase includes the storage of said REDO-information.

* * * * *